United States Patent [19]

Sproul

[11] 4,283,181
[45] Aug. 11, 1981

[54] HYDRAULIC BELT TENSIONER CONSTRUCTION

[75] Inventor: Nolte V. Sproul, Canton, Ohio

[73] Assignee: Dyneer Corporation, Westport, Conn.

[21] Appl. No.: 58,362

[22] Filed: Jul. 18, 1979

[51] Int. Cl.³ .............................................. F16H 7/12
[52] U.S. Cl. .................................. 474/110; 474/118
[58] Field of Search ............... 74/242.1 FP, 242.11 R, 74/242.11 B, 242.11 C, 242.11 E, 242.11 P, 242.11 A, 242.11 S, 242.11 W, 242.11 L, 242.15 R, 242.8, 242.9; 417/362; 91/432, 454; 474/110, 118

[56] References Cited

U.S. PATENT DOCUMENTS

| | | | |
|---|---|---|---|
| 2,002,081 | 5/1935 | Dow | 74/242.11 E |
| 2,051,488 | 8/1936 | Kottlowski et al. | 74/242.11 E |
| 2,703,019 | 3/1955 | Burawoy | 74/242.11 A |
| 2,828,170 | 3/1958 | Badgley | 91/432 X |
| 2,843,431 | 7/1958 | Beaufort | 74/242.8 X |
| 2,887,342 | 5/1959 | Helsel, Sr. | 91/432 X |
| 2,893,255 | 7/1959 | Bayliss | 74/242.8 |
| 3,132,596 | 5/1964 | Dinger | 74/242.15 R X |
| 3,142,193 | 7/1964 | Polko et al. | 74/242.11 R |
| 3,413,866 | 12/1968 | Ford | 74/242.11 R |
| 3,483,763 | 12/1969 | Enters | 74/242.15 R |
| 3,631,734 | 1/1972 | Wagner | 74/242.11 R |
| 3,768,324 | 10/1973 | Vanderstegen-Drake | 74/242.15 R |
| 3,785,220 | 1/1974 | Jacobs | 74/242.1 FP |
| 3,812,733 | 5/1974 | Yoshida | 74/242.11 S |
| 3,826,149 | 7/1974 | Freese | 74/242.8 |
| 3,924,483 | 12/1975 | Walker et al. | 74/242.11 R |
| 3,965,768 | 6/1976 | Foster | 74/242.15 R |
| 3,975,965 | 8/1976 | Speer | 74/242.15 R |
| 4,077,272 | 3/1978 | Busso | 74/242.1 FP |
| 4,144,772 | 3/1979 | Brackin et al. | 74/242.15 R |

FOREIGN PATENT DOCUMENTS 336737  10/1930  United Kingdom .

Primary Examiner—C. J. Husar
Assistant Examiner—Conrad Berman
Attorney, Agent, or Firm—Frease & Bishop

[57] ABSTRACT

A hydraulic tensioning device for maintaining a predetermined amount of tensioning force on an endless drive belt for the vehicle accessories drive system. A hydraulic cylinder is adapted to be mounted in a fixed position with respect to the vehicle engine and is operatively connected to the hydraulic fluid system of the engine. A bellcrank mechanism is pivotally mounted on the cylinder and has a belt-engaging idler pulley rotatably mounted on an extended end of one of the levers. The other lever is operatively engaged by the cylinder piston which pivots the idler pulley into tensioning engagement with the drive belt. A check valve is provided in the incoming hydraulic fluid passage of the cylinder and keeps that portion of the cylinder chamber which is located behind the piston filled with hydraulic fluid to maintain a constant predetermined tensioning force on the belt whether the engine is running or stopped, and to provide a shock-absorbing damping action for the idler pulley. The cylinder is connected to the power steering pump of the vehicle to provide a relatively high pressure to the cylinder for activation of the piston.

12 Claims, 7 Drawing Figures

HYDRAULIC BELT TENSIONER CONSTRUCTION

BACKGROUND OF THE INVENTION

1. Field of the Invention

The invention relates to belt tensioning devices, and in particular to hydraulically actuated belt tensioning devices for use with the endless drive belts of the drive systems for vehicle accessories. More particularly, the invention relates to a belt tensioner operable from the high pressure hydraulic fluid of the vehicle power steering pump, which maintains a predetermined constant tensioning force on the endless drive belt regardless of whether the engine is on or off, and which provides a shock-absorbing damping action on the tensioner.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt engaged idler pulley to a shorter distance than desired. Also, sudden acceleration and deceleration of the drive belt can cause a whipping action to occur which creates a time lag before full damping is achieved.

Numerous other types of belt tensioning devices use springs for applying and maintaining the tensioning force on a belt engaging idler pulley or chain engaging sprocket. Some examples of these types of constuctions are shown in U.S. Pat. Nos. 2,703,019, 2,893,255, 3,413,866, 3,483,763, 3,631,734, 3,768,324, 3,812,733, 3,924,483 and 3,965,768. Some of these various spring actuated devices use the biasing force of the spring in combination with hydraulic actuated members for regulating the amount of tensioning force applied to the belt, depending on whether the engine is running or shut off.

U.S. Pat. No. 2,051,488 shows a chain tensioning device in which a hydraulic cylinder is actuated when the engine is running to reduce the tensioning pressure which is exerted on the drive chain by a biasing spring. This hydraulic cylinder applies a counter force to the biasing action of the spring when the engine is running in order to decrease the tensioning force on the chain, whereupon the full biasing force of the spring is exerted on the chain when the engine is off and the hydraulic cylinder inactive. U.S. Pat. No. 3,142,193 discloses another belt tensioner using a hydraulically actuated bellcrank and belt engageing pulley in which a spring biases the pulley into tensioning engagement with the belt until the engine is operating, whereupon the hydraulic actuated piston imparts a greater tensioning force to the pulley through the bellcrank. When the engine stops, the piston retracts and the spring maintains a lesser tensioning force on the belt. U.S. Pat. No. 4,077,272 discloses another belt tensioner using both a spring and a hydraulic member to achieve the desired tensioning characteristics. In this device, when the engine is running, hydraulic oil from the engine lubricating system forces a piston back into its cylinder to overcome an internally mounted first spring so that only a second spring acts on the belt tensioning pulley when the engine is operating. When the engine is off, both springs act on the belt tensioning pulley. U.S. Pat. No. 3,132,596 shows a belt tensioner using a hydrostatic snubber controlled by the power steering pump of the vehicle, whereupon the snubber is forced outwardly in direct relationship to the output pressure of the power steering pump. This mechanism does not maintain a constant pressure on the belt when the vehicle engine is both on and off, and will apply different forces in relationship to the engine speed.

Many of these devices are believed to perform satisfactorily for their intended purpose, but it is preferred that the use of springs for effecting the tensioning force on a drive belt or chain, either for applying or retracting a tensioning member therefrom, presents problems. The operating characteristics of these springs will change over the life of the spring and even in response to changes in ambient temperature. Also, as the drive belt stretches, the spring's biasing effect changes, making it difficult to maintain a constant tensioning force on the drive belt. Likewise, the springs may become rusted and corroded and break during the life of the vehicle, presenting mechanical maintenance problems for the vehicle owner.

Accordingly, it is desirable to provide a belt tensioning device which eliminates the use of springs for controlling the movement of a belt engaging idler pulley, which device will maintain a constant predetermined tension on the belt throughout the full stroke of the pulley whether the engine is on or off or being driven at high or low speeds, and which device uses the oil of the vehicle hydraulic system for operation thereof.

There is no known belt tensioning device of which I am aware which imparts a constant predetermined tensioning force on an endless accessory drive belt by an idler pulley which is actuated entirely by the relatively high pressure of the hydraulic fluid from the power steering pump without the use of any springs or similar biasing means and which maintains this constant pressure on the belt whether the engine is on or off or operating at various speeds, and which prevents belt whip and achieves a highly efficient damping effect.

SUMMARY OF THE INVENTION

Objectives of the invention include providing a hydraulic belt tensioner construction which is actuated by the relatively high pressure hydraulic fluid of the vehicle power steering pump to maintain a constant predetermined tensioning force on the endless drive belt of the vehicle accessory drive system whether the engine is on or off or operating at various speeds and conditions. Another object is to provide a belt tensioner in which the hydraulic cylinder has a check valve system preventing the escape of hydraulic fluid from the cylinder, thereby maintaining constant pressure on the piston and providing a damping effect thereto, eliminating belt whip upon starting and stopping of the vehicle engine or upon rapid engine acceleration or deceleration. A further object is to provide such a belt tensioner which completely eliminates the use of springs or similar mechanical biasing components for imparting the belt tensioning force, which components are subject to breakage and changing operating characteristics, and in which the belt tensioner applies a constant force on the belt engaging idler pulley throughout the full stroke of the bellcrank mechanism on which the pulley is mounted. Furthermore, it is an object to provide a belt tensioner which is of a relatively simple construction, which eliminates maintenance and repair problems, which achieves the stated objectives in a simple, effective and relatively inexpensive manner, and which solves problems and satisfies needs existing in the art.

These objectives and advantages are obtained by the improved hydraulic belt tensioner construction which is used with the hydraulic system of a vehicle for automatically tensioning an endless belt of the drive system for the vehicle accessories, the general nature of which may be stated as including a hydraulic cylinder having a chamber formed therein, and a piston slidably mounted in said chamber. Bellcrank means is pivotally mounted on the cylinder, with the bellcrank means having first and second levers each with an extended end, and in which the first lever end is engaged by the piston for imparting pivotal movement to the bellcrank means upon actuation of said piston. Idler pulley means is rotatably mounted on the second lever end and engageable with the endless belt to apply tension thereto. Connection means connects the cylinder to the hydraulic system of the vehicle for supplying hydraulic fluid to the cylinder chamber for slidably moving the piston out of said chamber and into engagement with the first lever end. Check valve means control the flow of hydraulic fluid into and out of the cylinder chamber to maintain a constant predetermined amount of pressure on the piston and, correspondingly, on the belt, whether the vehicle engine is on or off, and provides a shock absorbing damping effect for the idler pulley.

BRIEF DESCRIPTION OF THE DRAWING

A preferred embodiment of the invention—illustrative of the best mode in which applicant has contemplated applying the principles—is set forth in the following description and shown in the accompanying drawing, and is particularly and distinctly pointed out and set forth in the appended claims.

Similar numerals refer to similar parts throughout the drawing.

DESCRIPTION OF THE PREFERRED EMBODIMENT

Figure 1:
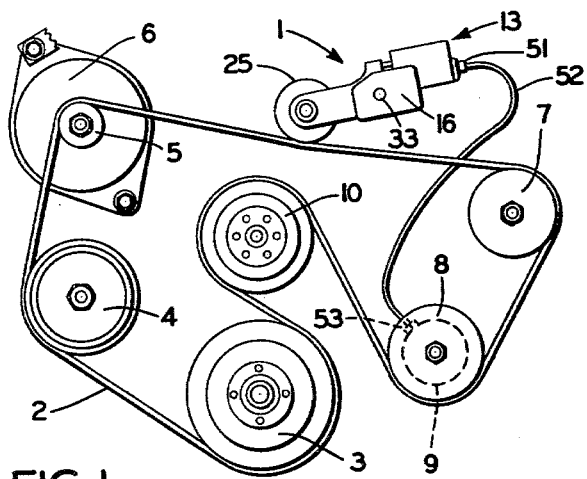
FIG. 1 is a diagrammatic view looking toward the front of an engine illustrating an endless drive belt operatively connected to and driving the vehicle accessories with the improved belt tensioner engaged therewith.

Referring to FIG. 1 of the drawings, the improved belt tensioner construction is indicated generally at 1 and is shown in tensioning engagement with an endless drive belt 2 of a power transmission belt drive system for the vehicle accessories. The drive system consists of a plurality of belt pulleys or sheaves having configurations and diameters determined by their associated engine accessory components and locations relative to each other. The various pulleys are supported on their respective engine components, which in turn are mounted on an engine (not shown) in a usual manner known in the art. Preferably, belt 2 operates in a single vertical plane which eliminates binding and skewing of the belt.

The engine accessories drive system consists of a main driving pulley 3 which is operatively connected to the main drive shaft of the engine, a pulley 4 which is operatively connected to the air conditioning motor, a pulley 5 which is operatively connected to an alternator 6 which provides the electrical power for the engine, a pulley 7 which is operatively connected to the engine air pump, a pulley 8 which is operatively connected to the vehicle's power steering unit 9, and a pulley 10 which is operatively connected to the engine water pump.

Tensioner 1 includes as main components a cylinder and bellcrank mechanism indicated generally at 13 and 14, respectively, which are mounted on and are located between a pair of side plates 15 and 16. Cylinder 13 is mounted between side plates 15-16 by a pair of transversely extending pins 17 (FIGS. 5 and 7) whose ends are peened at 12 against the outer surfaces of side plates 15-16 to rigidly mount cylinder 13 therebetween. A mounting pin 18 extends partially into cylinder 13 and through side plate 16. The extended end of pin 18 projects outwardly beyond side plate 16 and is adapted to be engaged in an alignment opening 11 formed in a mounting bracket 24, when mounting belt tensioner 1 on an engine adjacent belt 2.

Bellcrank 14 includes an integral one-piece lever member having an upstanding first lever 21 and a longer second lever 22 extending outwardly at a generally right angle with respect to first lever 21. Second lever 22 has a lateral offset section 23 and has an effective moment arm length (indicated by "A") approximately three times greater than the length of the moment arm (indicated by "B") of first lever 21. An idler pulley 25 is rotatably mounted on the outer or extended end of second lever 22 by a bearing assembly (not shown) journalled on a stub shaft 26.

Figure 7:
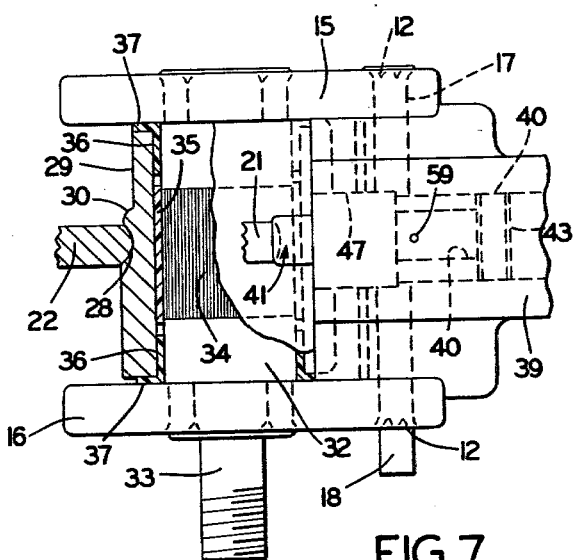
FIG. 7 is an enlarged fragmentary top plan view similar to FIG. 2, with portions broken away and in section.
Figure 2:
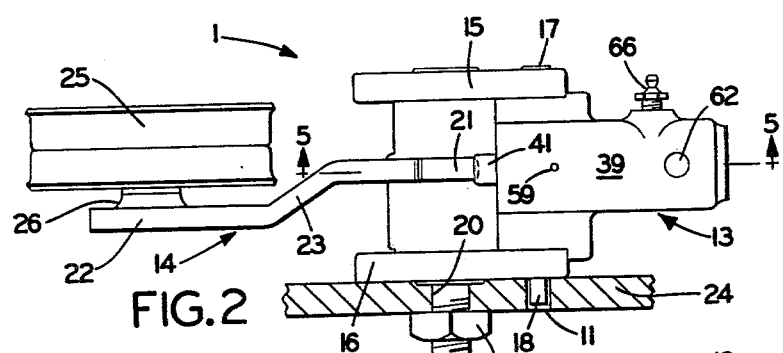
FIG. 2 is an enlarged top plan view of the improved belt tensioner mounted on a portion of an engine bracket, shown in section.
Figure 3:
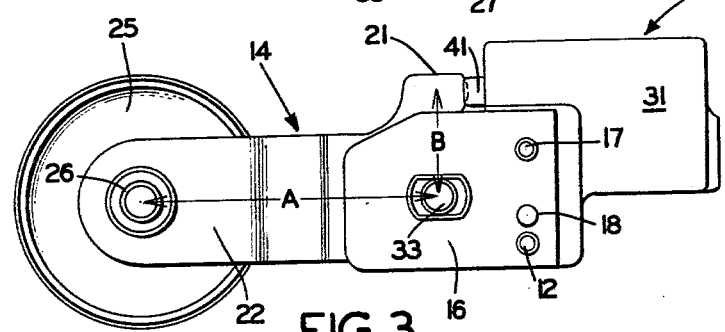
FIG. 3 is an elevational view of the improved belt tensioner of FIG. 2 with the engine mounting bracket removed.
Figure 4:
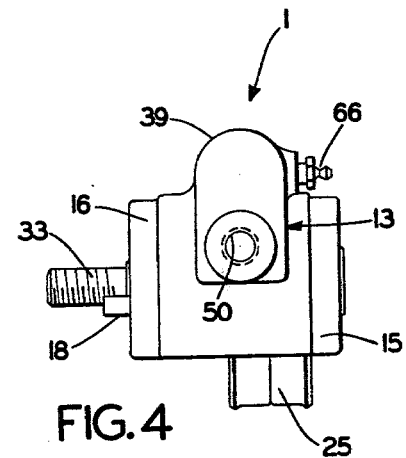
FIG. 4 is a right-hand end elevational view of the belt tensioner of FIG. 3.

The one-piece lever member preferably is formed of metal and has a generally circular-shaped portion at the junction of levers 21 and 22 and has a circular opening 28 formed therethrough. A cylindrical metal sleeve 29 is inserted through circular opening 28 and secured therein by a plurality of circumferentially spaced metal deformations 30 (FIGS. 5 and 7) or other types of fastening means, such as welding, brazing or the like. Sleeve 29 and attached bellcrank 14 are pivotally mounted between side plates 15–16 on a pivot shaft 32. Shaft 32 extends through a pair of openings formed in side plates 15–16 and is secured therein by a press fit so as to be fixed in a nonrotatable condition with respect to the side plates. Pivot shaft 32 terminates at one end in a reduced diameter threaded bolt end 33 which extends outwardly beyond side plate 16 parallel with mounting pin 18 (FIG. 7). Bolt end 33 is adapted to extend through an opening 30 in mounting bracket 24 for attaching belt tensioner 1 in a fixed position on an appropriate bracket 24 adjacent endless belt 2 by a nut 27. Tensioner 1 preferably engages belt 2 at a location between pulleys 5 and 7 of alternator 6 and of the air pump, as shown in FIG. 1, although this location is not crucial for its effective operation.

A central area of pivot shaft 32 is knurled at 34 and has a sleeve of plastic material 35, such as polyurethane, force fitted thereon. Sleeve 35 retards the pivotal movement of cylindrical sleeve 29 on pivot shaft 32 to provide a damping effect to idler pulley 25, together with hydraulic fluid as described below. A pair of bushings 36 having outturned end flanges 37 formed of a low-friction material is telescopically mounted on the ends of pivot shaft 32 adjacent side plates 15–16. Bushings 36 provide a relatively low-friction cylindrical sliding surface for the internal bore of bellcrank sleeve 29 (FIG. 7) and provide a filler to prevent wobble between sleeve 29 and pivot shaft 32.

Figure 5:
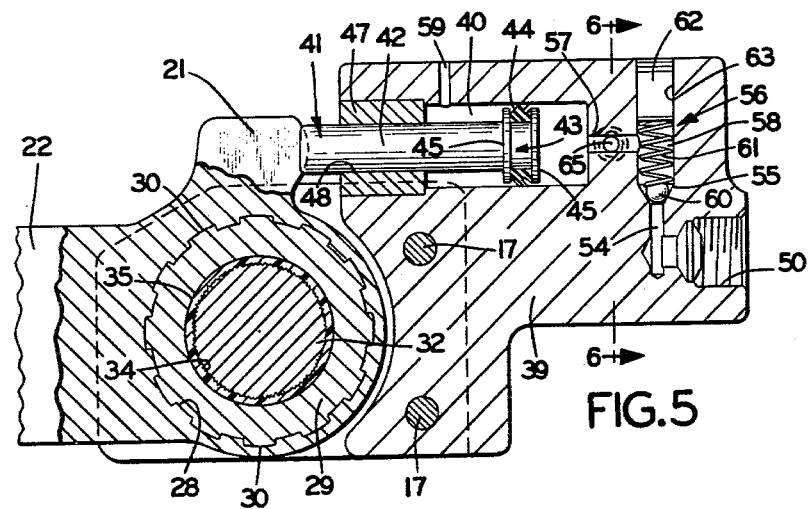
FIG. 5 is an enlarged fragmentary sectional view taken on line 5—5, FIG. 2.

Cylinder 13 is formed with a cylindrical-shaped chamber 40 which extends inwardly from the front of cylinder 13 and longitudinally throughout an upper portion of the cylinder body 39 (FIG. 5). A piston 41 is slidably mounted in chamber 40, as in a usual hydraulic or pneumatic actuated cylinder-piston arrangement. Piston 41 includes a piston rod 42 terminating at one end in a piston head 43 having a sealing ring 44 mounted therein between a pair of spaced discs 45. The outer open end of chamber 40 is sealed by a bushing 47 which has a bore 48 through which the forward end of piston rod 42 slidably moves. The outer end of piston rod 42 operatively engages the extended end of first lever 21 for pivotally moving bellcrank 14 to tension belt 2 by the pressure exerted thereon by idler pulley 25.

In accordance with one of the features of the invention, cylinder body 39 is provided with a check valve system for regulating the oil or hydraulic fluid flow into and out of chamber 40 to maintain a constant predetermined pressure on belt 2 through bellcrank 14, while providing a damping, shock-absorbing effect thereto. An internally threaded inlet port 50 is formed in the rear portion of cylinder body 39 and is adapted to receive an end connector 51 of a supply line 52. Supply line 52, preferably formed of a flexible tube, is connected at 53 to the power steering unit or pump 9 of the vehicle, as shown in FIG. 1.

Inlet 50 is connected to the rear of chamber 40 by passages 54 and 57 which communicate with a ball check valve, indicated generally at 56. Check valve 56 includes a cylindrical, vertically extending cavity 58 having a valve ball 60 located therein which is biased toward closed position in valve seat 55 by a coil spring 61. Spring 61 is retained in cavity 58 by a sealing plug 62 which is threadably engaged within a threaded opening 63 extending downwardly into cylinder body 39.

Figure 6:
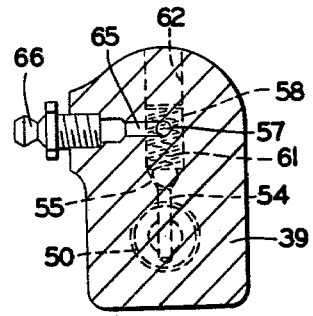
FIG. 6 is a sectional view taken on line 6—6, FIG. 5.

Another passage 65 extends laterally, horizontally through cylinder body 39 (FIGS. 6 and 7) and communicates with passage 57. Passage 65 enables air trapped within the rear of chamber 40 to be expelled therefrom upon the initial introduction of hydraulic fluid into chamber 40 or for bleeding hydraulic fluid therefrom when rod 42 is retracted to install a new belt or reinstall belt 2. A plug 66 is threadably engaged in the outer end of passage 65 for sealing the same. An air vent 59 (FIG. 5) communicates with the forward portion of chamber 40 and the surrounding atmosphere in a usual manner as in many hydraulic cylinders.

The operation of the improved belt tensioner 1 is described below. The power steering pump 9 produces a maximum pressure within a predetermined range, such as from 1350 to 1450 psi, under certain vehicle steering conditions. This pressure, which is relatively high in comparison to the rest of the vehicle oil lubricating system, which for many vehicles operates at a pressure of approximately 30–55 psi, will pump oil through line 52 and into the rear of chamber 40 through passages 54 and 57 and check valve cavity 58. Relatively low pressure will raise ball 60 from valve seat 55, permitting the flow of oil into cavity 58. After all of the trapped air, located in the rear of chamber 40 behind valve head 43, has been expelled to the atmosphere through passage 65, plug 66 is secured therein to seal passage 65.

By initially determining the desired amount of downward force to be maintained on belt 2 by pulley 25 and knowing the maximum amount of hydraulic pressure which will be applied to piston rod 42 by power steering pump 9, calculations can be made to determine the required diameter of piston head 43 and cylinder 40 which determines the outward force exerted by the extended end of piston rod 42. The outward thrust of piston rod 42 is the moment force acting on the moment arm of lever 21 and, correspondingly, applied to belt 2 through the effective moment arm of lever 22 to arrive at the predetermined desired idler pulley force. For the particular vehicle application for which belt tensioner 1 was originally intended for use, a downward force of approximately 150 lbs. is applied by pulley 25 on belt 2.

In accordance with one of the main features of the invention, the high hydraulic pressure which is exerted on piston head 43 is trapped in the rear of chamber 40 by check valve 56 maintaining this constant pressure on the piston rod and, correspondingly, on pulley 25 through bellcrank 14, since the hydraulic fluid is for all purposes noncompressible. Thus, as the operating pressure of power steering pump 9 varies below its maximum amount and regardless of whether the vehicle engine is running or stopped, this high pressure is still captured within the rear of chamber 40 and applied to piston rod 42. Any small leakage which could occur around sealing ring 44 will be quickly replenished upon power steering pump 9 again operating in its maximum pressure range. Due to the noncompressibility of the trapped hydraulic fluid, piston rod 42 can not move inwardly in cylinder 40, preventing belt 2 from lifting pulley 25 from its tensioning position during the sudden acceleration or deceleration of the engine and possible whipping action of belt 2.

Plastic sleeve 35, which is firmly mounted on pivot shaft 32, provides a sliding engagement with the interior bore of metallic sleeve 29. The particular plastic material used for sleeve 35 (polyurethane), or similar materials, provides sufficient friction to retard, but not prevent, sliding movement between sleeves 29 and 35. Thus, when a sudden slackening or inward movement of belt 2 occurs at the point of engagement with pulley 25, sleeve 35 will prevent bellcrank 14 from moving quickly in a counterclockwise direction under the pressure exerted by piston rod 42. Thus, the particular pivotal mounting arrangement of bellcrank mechanism 14 on sleeve 35 of pivot shaft 32 in combination with the trapped hydraulic fluid, provides a shock-absorbing, damping effect to belt tensioner construction 1.

Another advantage of belt tensioner 1 is that the desired predetermined force is applied continuously by pulley 25 against belt 2 throughout the entire angular pivotal movement of lever arm 22 during the service life of belt 2. As belt 2 stretches, lever 22 will pivot in a counterclockwise direction under the urging of piston rod 42, with the rear portion of chamber 40, located behind piston head 43, filling with hydraulic fluid to compensate for and cause the pivotal movement of bellcrank 14 without changing the force applied by piston rod 42 on engaged lever end 21.

Maintenance can be performed easily on any of the accessories driven by belt 2 or belt 2 can be replaced easily should it become broken or excessively worn. Plug 66 is removed enabling piston 41 to be retracted in cylinder 40 with the trapped oil escaping through passage 65. Lever 22 then can be pivoted in a clockwise direction, releasing the tensioning pressure on belt 2. After the belt is reinstalled, oil is allowed to re-enter chamber 40 through passages 54 and 57, expelling any trapped air through passage 65. Plug 66 then is installed, placing belt tensioner 1 in its usual, continuous operating condition.

Accordingly, the improved belt tensioner construction is simplified, provides an effective, safe, inexpensive, and efficient device which achieves all the enumerated objectives, provides for eliminating difficulties encountered with prior tensioning devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved hydraulic belt tensioning device is constructed and used, the characteristics of the construction, and the advantageous, new and useful results obtained; the new and useful structures, devices, elements, arrangements, parts and combinations are set forth in the appended claims.

I claim:

1. A hydraulic belt tensioner construction for use with the hydraulic system of a vehicle for automatically tensioning an endless belt of the drive system for the vehicle accessories, said construction including:
   (a) a hydraulic cylinder having a chamber formed therein, and a piston slidably mounted in said chamber, said cylinder being adapted to be fixedly mounted with respect to the drive belt;
   (b) bellcrank means pivotally mounted directly on the cylinder, said bellcrank means having first and second levers, each with an extended end, with said first lever end being engaged by the piston for imparting pivotal movement to the bellcrank means upon actuation of said piston;
   (c) idler pulley means rotatably mounted on the second lever end and engageable with the endless belt to apply tension thereto;
   (d) means connecting the cylinder to the hydraulic system of the vehicle for automatically supplying hydraulic fluid to the cylinder chamber for slidably moving the piston out of said chamber and into engagement with the first lever end; and
   (e) check valve means formed integrally within the hydraulic cylinder for automatically controlling the flow of hydraulic fluid into and out of the cylinder chamber to provide the entire belt tensioning force by maintaining a constant predetermined amount of pressure on the piston and, correspondingly, on the belt, whether the vehicle engine is on or off, and to provide a shock-absorbing damping effect for the idler pulley.

2. The belt tensioner construction defined in claim 1 in which the second lever has an effective moment arm length of approximately three times the effective length of the moment arm of the first lever.

3. The belt tensioner construction defined in claim 1 in which the hydraulic fluid supply connecting means is a flexible tube extending between and operatively connecting the hydraulic cylinder and a power steering pump of the vehicle.

4. The belt tensioner construction defined in claim 1 in which the maximum hydraulic pressure exerted on the piston is approximately 1350 to 1450 psi, and the tensioning force exerted on the belt by the idle pulley is approximately 150 lbs.

5. The belt tensioner construction defined in claim 1 in which the check valve means is a spring biased ball valve.

6. The belt tensioner construction defined in claim 1 in which the first and second levers include a generally L-shaped one-piece member formed with an opening at the junction of said first and second levers; in which a cylindrical hub is telescopically mounted in the opening of the lever member and secured to said member for rotation therewith; in which a shaft is fixedly mounted with respect to the hydraulic cylinder; in which the cylindrical hub is pivotally mounted on the fixed shaft; and in which bushing means is telescopically mounted on the shaft and located within the cylindrical hub to provide a pivotal sliding engagement between said hub and shaft.

7. The belt tensioner construction defined in claim 6 in which the hydraulic cylinder is mounted between a pair of spaced side plates; in which the shaft is mounted on the plates and extends transversely therebetween; and in which a pair of mounting stud means extend outwardly from one of the side plates for mounting the belt tensioner construction on a vehicle.

8. The belt tensioner construction defined in claim 1 in which the check valve means includes an inlet port adapted to be operatively connected to the hydraulic fluid supply, a cavity having a spring biased ball valve movably mounted therein, and a passage extending between and communicating with the cavity and rear of the cylinder chamber; and in which the ball valve permits the flow of hydraulic fluid in only one direction from the inlet port into the cavity for discharge into the cylinder.

9. The belt tensioner construction defined in claim 8 in which a second passage is formed in the cylinder and communicates with the cylinder chamber and surrounding atmosphere to provide for removal of trapped air and hydraulic fluid from the rear of the chamber; and in which removable closure means is mounted on the cylinder to selectively close the second passage.

10. A hydraulic belt tensioner construction for use with the hydraulic system of a vehicle for automatically tensioning an endless belt of the drive system for the vehicle accessories, said construction including:
    (a) a hydraulic cylinder having a chamber formed therein, and a piston slidably mounted in said chamber;
    (b) bellcrank means pivotally mounted on the cylinder, said bellcrank means having first and second levers, each with an extended end, said first lever end being engaged by the piston for imparting pivotal movement to the bellcrank means upon actuation of said piston, and said second lever having an effective moment arm length of approximately three times the effective length of the moment arm of the first lever;
    (c) idler pulley means rotatably mounted on the second lever end and engageable with the endless belt to apply tension thereto;
    (d) means connecting the cylinder to the hydraulic system of the vehicle for supplying hydraulic fluid to the cylinder chamber for slidably moving the piston out of said chamber and into engagement with the first lever end; and
    (e) check valve means controlling the flow of hydraulic fluid into and out of the cylinder chamber to maintain a constant predetermined amount of pressure on the piston and, correspondingly, on the belt, whether the vehicle engine is on or off, and to provide a shock-absorbing damping effect for the idler pulley.

11. A hydraulic belt tensioner construction for use with the hydraulic system of a vehicle for automatically tensioning an endless belt of the drive system for the vehicle accessories, said construction including:
    (a) a hydraulic cylinder having a chamber formed therein, and a piston slidably mounted in said chamber;
    (b) bellcrank means pivotally mounted on the cylinder, said bellcrank means including a generally L-shaped one-piece member providing first and second levers, each with an extended end, with said first lever end being engaged by the piston for imparting pivotal movement to the bellcrank means upon actuation of said piston;
    (c) an opening formed in the L-shaped member at the junction of the first and second levers;
    (d) a shaft fixedly mounted with respect to the hydraulic cylinder;
    (e) a cylindrical hub telescopically mounted in the opening of the L-shaped member and secured to said member for rotation therewith, with said cylindrical hub being pivotally mounted on the shaft;
    (f) bushing means telescopically mounted on the shaft and located within the cylindrical hub providing a pivotal sliding engagement between said hub and shaft;
    (g) idler pulley means rotatably mounted on the second lever end and engageable with the endless belt to apply tension thereto;
    (h) means connecting the cylinder to the hydraulic system of the vehicle for supplying hydraulic fluid to the cylinder chamber for slidably moving the piston out of said chamber and into engagement with the first lever end; and
    (i) check valve means controlling the flow of hydraulic fluid into and out of the cylinder chamber to maintain a constant predetermined amount of pressure on the piston and, correspondingly, on the belt, whether the vehicle engine is on or off, and to provide a shock-absorbing damping effect for the idler pulley.

12. The belt tensioner construction defined in claim 11 in which the cylindrical hub and one-piece lever member are formed of metal; and in which the hub and lever member are joined by metal deformation of the adjacent metal areas.

* * * * *